(12) United States Patent
Yokota et al.

(10) Patent No.: US 7,236,469 B2
(45) Date of Patent: Jun. 26, 2007

(54) DATA TRANSFER SYSTEM USING MOBILE IP

(75) Inventors: Hidetoshi Yokota, Saitama (JP); Toru Hasegawa, Saitama (JP)

(73) Assignee: KDDI Corporation, Tokyo (JP)

( * ) Notice: Subject to any disclaimer, the term of this patent is extended or adjusted under 35 U.S.C. 154(b) by 1063 days.

(21) Appl. No.: 10/272,994

(22) Filed: Oct. 18, 2002

(65) Prior Publication Data

US 2003/0076845 A1 Apr. 24, 2003

(30) Foreign Application Priority Data

Oct. 23, 2001 (JP) ............................. 2001-325457

(51) Int. Cl.
*H04Q 7/00* (2006.01)
(52) U.S. Cl. ...................... 370/328; 455/435
(58) Field of Classification Search .................. None
See application file for complete search history.

(56) References Cited

U.S. PATENT DOCUMENTS

| | | | | |
|---|---|---|---|---|
| 6,675,208 B1* | 1/2004 | Rai et al. | ..................... | 709/224 |
| 7,031,275 B1* | 4/2006 | Borella et al. | .............. | 370/328 |
| 7,106,710 B1* | 9/2006 | Smith | ......................... | 370/331 |
| 2001/0036164 A1* | 11/2001 | Kakemizu et al. | .......... | 370/331 |
| 2003/0018715 A1* | 1/2003 | O'Neill | ..................... | 709/204 |

OTHER PUBLICATIONS

IP Mobility Support; (C. Perkins, Editor IBM Oct. 1996, Standards Track, pp. 1-79).

* cited by examiner

*Primary Examiner*—Chi Pham
*Assistant Examiner*—Anh-Vu Ly
(74) *Attorney, Agent, or Firm*—Westerman, Hattori, Daniels & Adrian, LLP.

(57) ABSTRACT

According to the present invention, there is provided a data transfer system using mobile IP in which transfer interruption is not caused even if an MH moves between FNs. A MAC bridge connected between FNs includes means responsive to an address registration request issued by an AP, for storing a combination of a MAC address of the MH and a receiving port, in a filtering DB; means for registering a relation of association of an address of a terminal accommodated in an FN with a connection port of an FN in which the terminal is accommodated, in the filtering DB; and means for referring to the filtering DB on the basis of the destination address of a frame input to each port, and transferring the frame to a predetermined port on the basis of a relation of association of the address with a port identifier.

4 Claims, 10 Drawing Sheets

DATA TRANSFER SYSTEM USING MOBILE IP

BACKGROUND OF THE INVENTION

1. Field of the Invention

The present invention relates to a data transfer system using mobile IP. In particular, the present invention relates to a data transfer system using mobile IP that makes possible efficient seamless data transfer for a mobile terminal moving between foreign networks.

2. Description of the Related Art

In the Internet, a network address portion of an IP address assigned to a mobile host (MH) becomes an address peculiar to a home network (HN) to which the MH belongs. When the MH has moved to a foreign network(FN), it is necessary to newly acquire an IP address containing an address peculiar to the FN.

On the other hand, as a technique for continuing connection without changing an IP address as if the MH is connected to the HN even in the case where the MH is moved from the HN to the FN, the mobile IP prescribed in RFC (Request For Comments) 2002 has been standardized.

In order to implement the mobile IP, a node called home agent (HA) is disposed in the HN and a node called foreign agent (FA) is disposed in the FN as shown in FIGS. 9 to 12.

Since the MH has already acquired an IP address that can be utilized in the HN, the MH can directly receive IP packets while the MH is connected to the HN. When the MH has moved to an FN, or when the MH has moved between FNs, the MH recognizes the FN to which the MH itself belongs, by receiving an agent advertisement (AA) message publicized periodically by an FA of movement destination. As shown in FIG. 9, the MH places the IP address of the FA of the movement destination on an RRQ (registration request) message, and notifies it to the HA of the HN. In response to the RRQ message, the HA transfers an RRP (registration reply) message to the MH via the FA and completes the location registration.

Thereafter, all IP packets sent from an opposite terminal CN toward the MH are taken over by the HA as shown in FIG. 10. The HA encapsulates (IP-tunnels) IP packets having the IP address of the MH as destination by using IP packets having the IP address of the FA as destination, and transfers resultant IP packets to the FA via the Internet. From the encapsulated IP packets, the FA restores the original IP packets directed to the MH. The FA transfers the restored original IP packets to the MH via an access point AP.

As for data directed from the MH to the CN, the data are transferred to a GWR whose address has been acquired by an AA message transmitted from the FN as shown in FIG. 11. As a result, the data are transferred to the CN according to ordinary IP routing.

If the MH moves from FN1 to FN2 as shown in FIG. 12, then the MH establishes an association with an AP of movement destination, thereafter issues a registration request to the HA, and causes the HA to transfer data directed to the MH.

In the conventional communication using mobile IP, the intervals at which the FA sends AA messages are at least approximately once per second. As a matter of fact, the lifetime of AA messages is defined as at least three (3) seconds. During at least this period, the MH does not send the RRQ message. Therefore, the time required for the HA to recognize movement of the MH becomes long. Until the location registration is completed, all data directed to the MH are transferred from the CN to the FN1, which is the FN before the movement. In other words, transfer interruption is caused until location registration at the movement destination is completed. The MH attempts to transfer data directed to the CN to the GWR of the FN1 preceding the movement. However, the data are not transferred because the GWR of the FN1 is in another network. In this case as well, transfer interruption is caused.

SUMMARY OF THE INVENTION

An object of the present invention is to provide a data transfer system using mobile IP that does not cause a transfer interruption even when an MH moves between FNs and makes possible seamless data transfer.

In accordance with the present invention, there is provided a data transfer system using mobile IP comprising: a MAC (media access control) bridge having a plurality of ports to which different FNs are respectively connected, and a filtering database on the MAC bridge, in which the MAC bridge includes: means responsive to a MAC address registration request issued by an AP in an FN, for storing the MAC address of the mobile terminal and an identifier of a port to which the FN is connected, in the filtering DB; means for registering a relation of association of the MAC address of the MH accommodated in an FN with an identifier of a port to which the FN is connected, in the filtering DB, on the basis of an AA message transmitted from an FA accommodated in each FN; and means for referring to the filtering DB on the basis of the destination MAC address of a frame input to each port, and transferring the frame to the port on the basis of the already registered relation of association of the address with a port identifier.

According to the feature, when the MH has moved from the FN1 to the FN2, the MH can receive a frame directed to the MH but transferred to the FN1 where the MH was located before the movement, in the FN2 whereto the MH has moved, via the MAC bridge, even before location registration is completed, that is, reception of the AA message, transmission of the RRQ (registration request) message, and reception of the RRP (registration reply), if only a registration request of the MAC address of the MH is transmitted to the MAC bridge irrespective of the reception of the AA (agent advertisement) message and the MAC bridge registers the relation of association of its own address with the FN2 accommodating its own address in the filtering DB.

DETAILED DESCRIPTION OF THE PREFERRED EMBODIMENT

Figure 1:
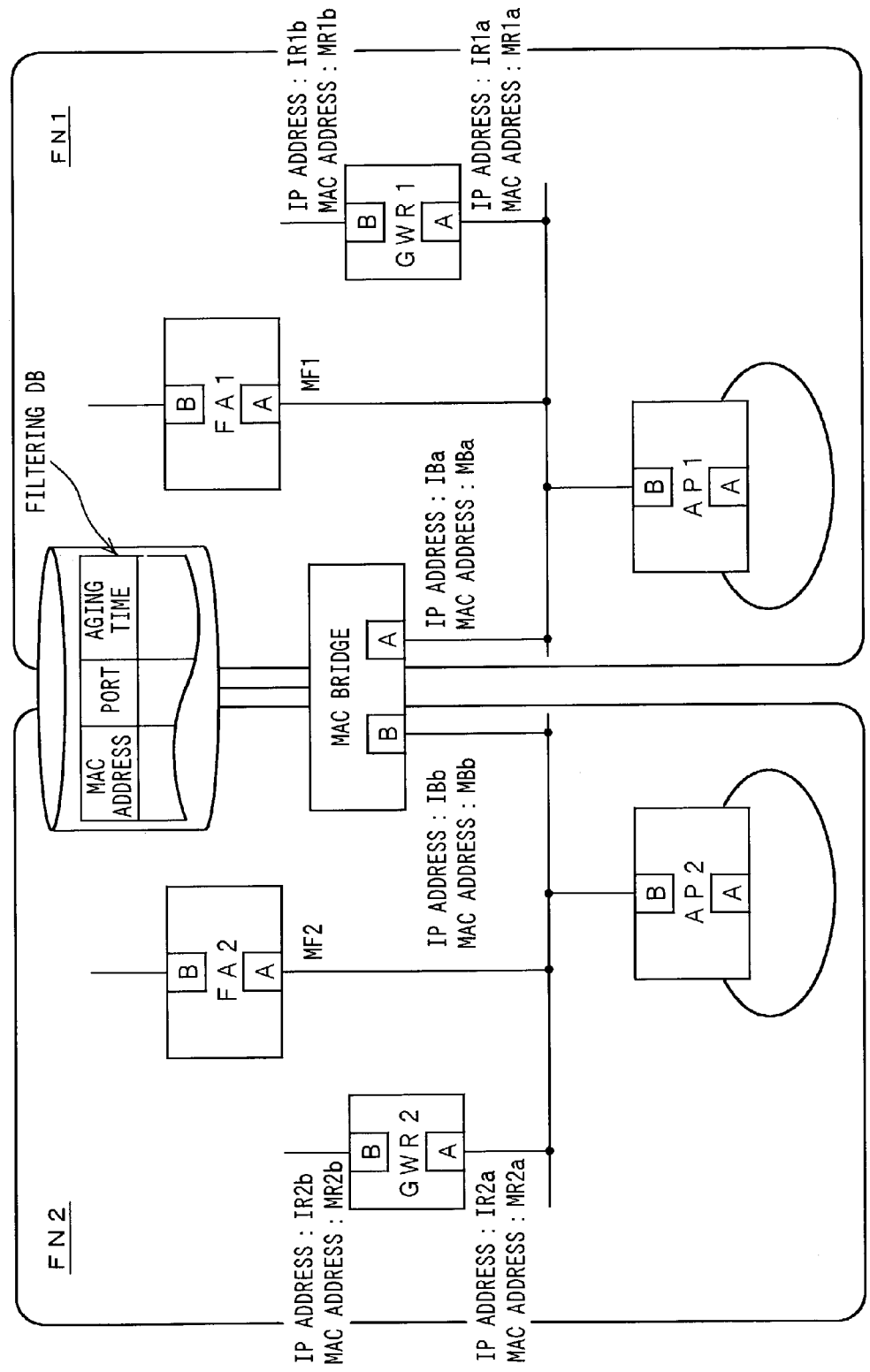
FIG. 1 is a block diagram showing a configuration of an embodiment according to the present invention.

FIG. 1 is a block diagram showing a network configuration of mobile IP to which the present invention is applied. A plurality of foreign networks FN1 and FN2 are connected to each other by a MAC bridge.

The case where two FNs, i.e., FN1 and FN2 are connected to each other by the MAC bridge will now be described as an example. However, a similar operation is also conducted in the case where three or more FNs, i.e., FN1, FN2, FN3, . . . are connected. The FN1 is connected to a port A of the MAC bridge, and the FN2 is connected to a port B of the MAC bridge. AP1 and AP2 are accommodated in the FN1 and FN2, respectively.

The FN1 accommodates a plurality of nodes including FA1 and GWR1. The FN2 accommodates a plurality of nodes including FA2 and GWR2. MAC addresses of nodes and terminals accommodated in each of the FN1 and FN2 are registered in a filtering DB of the MAC bridge, together with an identifier ("A" or "B") of a port where the accommodating FN is connected to the MAC bridge and an aging time, as described in detail later. The present embodiment has a feature that each of the FN1 and FN2 is made to conduct handover fast by using its layer 2 function.

Figure 2:
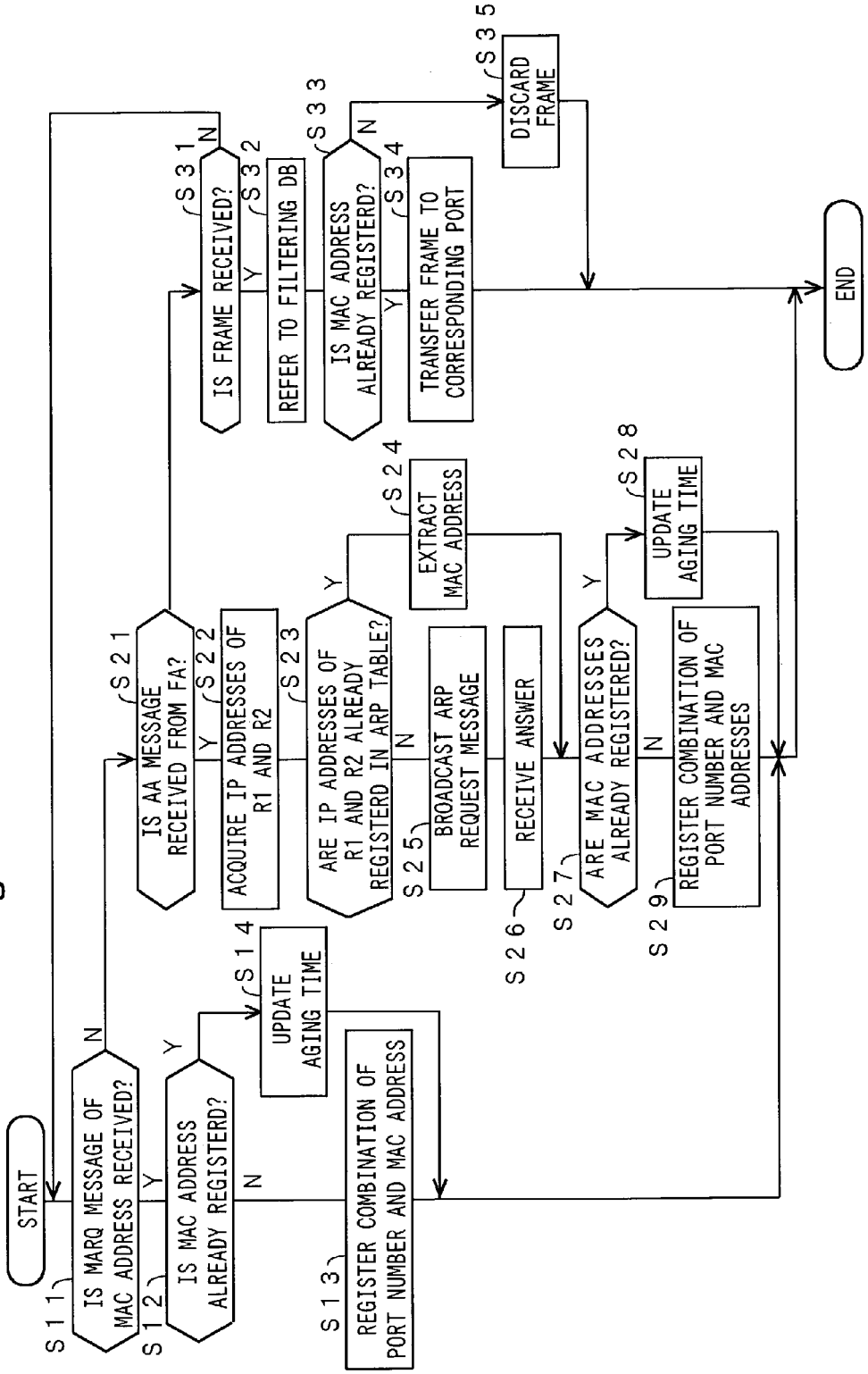
FIG. 2 is a flowchart showing an operation in the embodiment according to the present invention.
Figure 3:
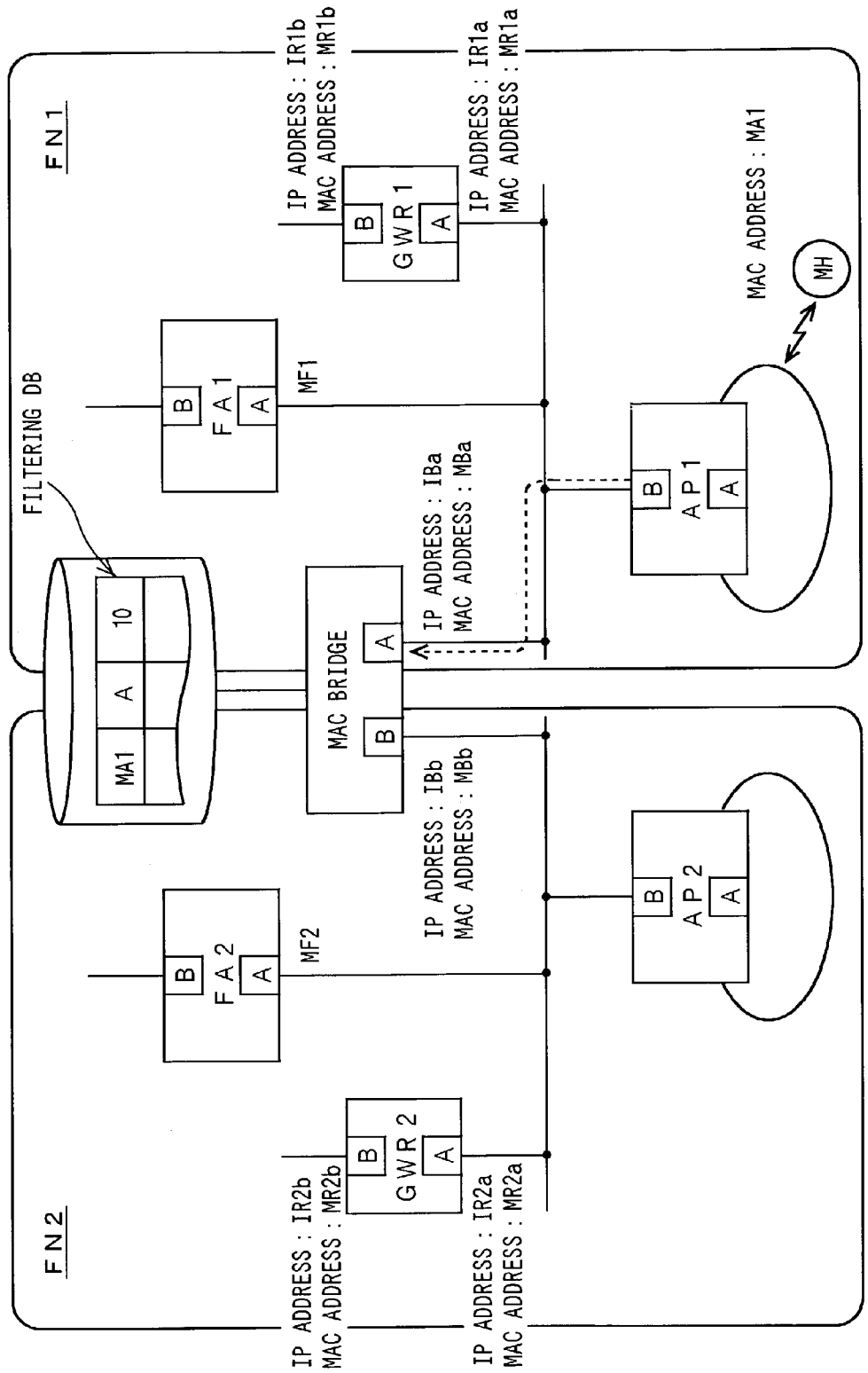
FIGS. 3 to 6 are block diagrams showing a method of registering an address in a MAC bridge.

Operation of the present embodiment will now be described with reference to a flowchart of FIG. 2. If an MH moves from an HN to the FN1 and connection between the AP1 in the FN1 and the MH is established as shown in FIG. 3, then the AP1 advertises a MAC address registration request MARQ message concerning a MAC address "MA1" of the MH from a port other than a radio interface.

If the MAC bridge receives the MARQ message from the port A at step S11, then the MAC bridge determines whether a combination of the MAC address "MA1" of the MH and the identifier "A" of the receiving port has already been registered in the filtering DB at step S12. Since the combination is judged to be not yet registered, the combination of the MAC address "MA1" and the receiving port "A" is registered in the filtering DB together with an aging time (in the present embodiment, the initial value is "10").

If the relation of association of the MAC address "MA1" with the port identifier "A" has already been registered in the filtering DB, then the aging time is updated to the initial value at step S14. The aging time decreases with the time lapse. When the aging time has become "0," the entry is erased.

Figure 4:
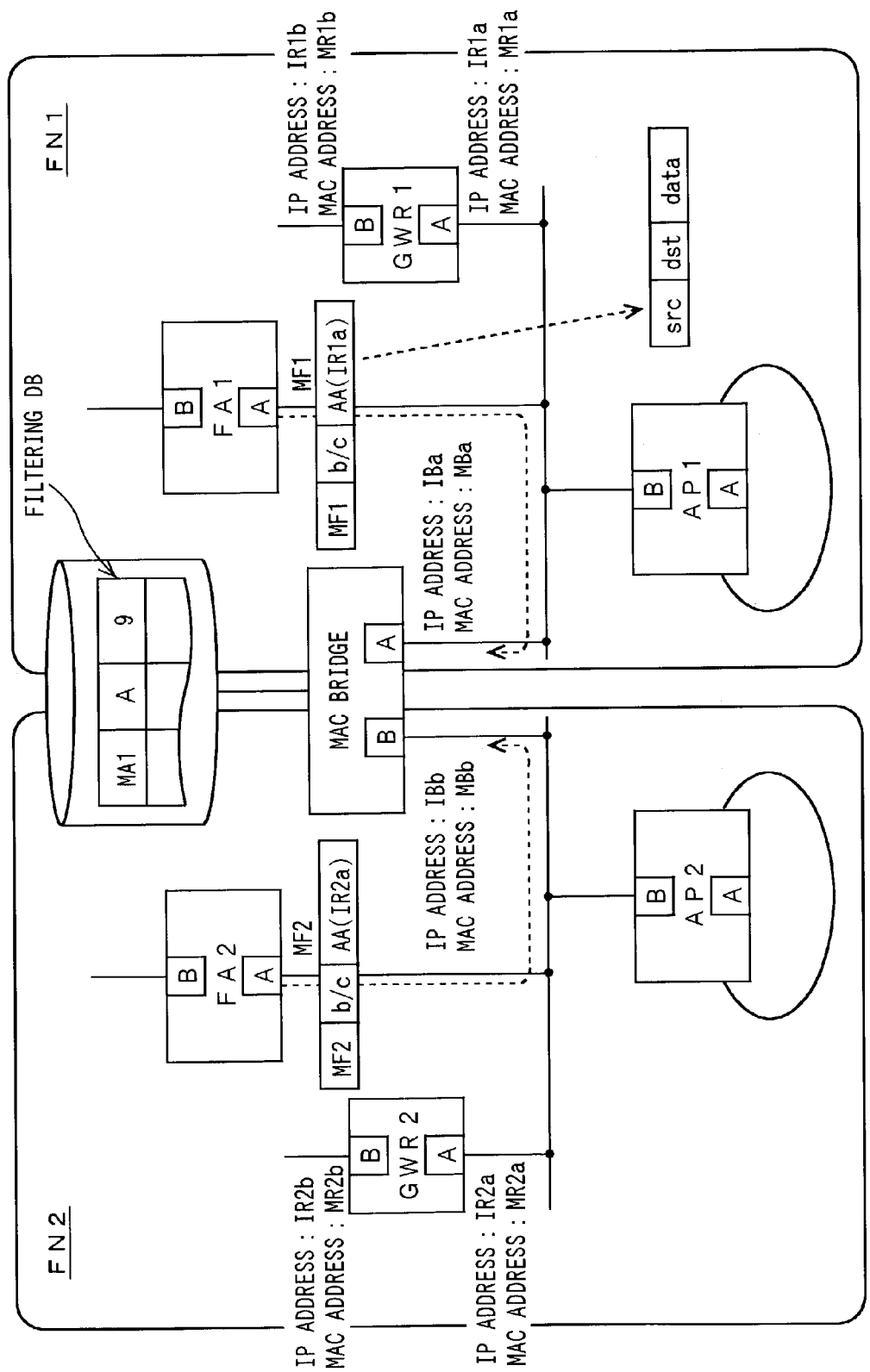

If the MAC bridge receives an AA message from FA1 and FA2 respectively on the FN1 and FN2 connected to respective ports as shown in FIG. 4 at step S21, the MAC bridge extracts IP addresses of GWR1 and GWR2 respectively in the FN1 and FN2 at step S22. In FIG. 4, an AA message sent from the FA1 is input to the port A and an AA message sent from the FA2 is input to the port B.

In the AA message sent from the FA1, a MAC address [MF1] of the FA1 is stored in the source address region (src). In the destination address region (dst), an address [b/c] to the effect that the pertinent frame is a broadcast (advertisement) is stored. In the data region (data), information [AA(IR1a)] to the effect that the pertinent frame is an AA message of the GWR1 having "IR1a" as its IP address is stored.

In the AA message sent from the FA2, a MAC address [MF2] of the FA2 is stored in the source address region (src). In the destination address region (dst), an address [b/c] to the effect that the pertinent frame is a broadcast (advertisement) is stored. In the data region (data), information [AA(IR2a)] to the effect that the pertinent frame is an AA message of the GWR2 having "IR2a" as its IP address is stored.

Upon receiving the AA message, the MAC bridge determines whether IP addresses of the GWR1 and GWR2 are already registered in an ARP (address resolution protocol) table, which is not shown, at step S23. In the ARP table, a MAC address corresponding to an IP address is stored by using the IP address as an index. If the IP address is already registered, the MAC bridge extracts a MAC address corresponding to the IP address at step S24. The processing proceeds to step S27 described later. If a MAC address corresponding to the IP address is not yet registered in the ARP table, then the MAC bridge broadcasts an ARP request message at step S25 in order to inquire of GWR1 and GWR2 about MAC addresses corresponding to their IP addresses.

Figure 5:
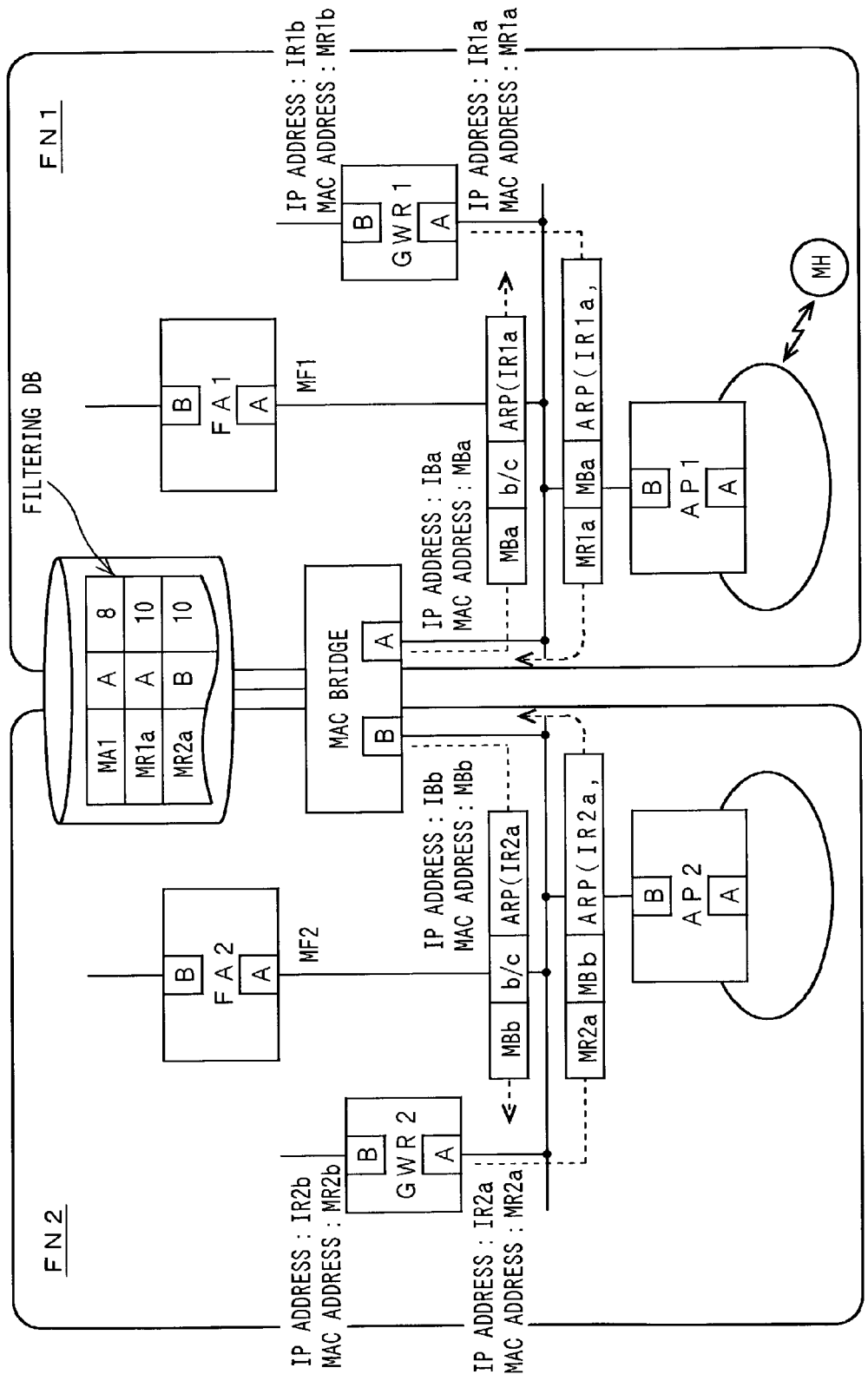

In the ARP request message broadcast from the port A of the MAC bridge, a MAC address [MBa] of the port A of the MAC bridge is stored in the source address region as shown in FIG. 5. In the destination address region, an address [b/c] to the effect that the pertinent frame is a broadcast is stored. In the data region, information [ARP(IR1a)] to the effect that the pertinent frame is a MAC address request to the GWR1 having "IR1a" as its IP address is stored.

In the ARP request message broadcast from the port B of the MAC bridge, a MAC address [MBb] of the port B of the MAC bridge is stored in the source address. In the destination address region, an address [b/c] to the effect that the pertinent frame is a broadcast is stored. In the data region, information [ARP(IR2a)] to the effect that the pertinent frame is a MAC address request to the GWR2 having "IR2a" as its IP address is stored.

In response to the ARP request message, the GWR1 returns a frame having a MAC address [MR1a] of the GWR1 itself as the source address thereof, a MAC address [MBa] of the port A of the MAC bridge as the destination address thereof, and a relation of association [ARP(IR1a, MR1a)] between the IP address and the MAC address as data thereof.

In response to the ARP request message, the GWR2 also returns a frame having a MAC address [MR2a] of the GWR2 itself as the source address thereof, a MAC address [MBb] of the port B of the MAC bridge as the destination address thereof, and a relation of association [ARP(IR2a, MR2a)] between the IP address and the MAC address as data thereof.

The MAC bridge receives respective frames and acquires MAC addresses of the GWR1 and GWR2 at step S26. The MAC bridge determines whether each combination of the MAC address and the receiving port is already registered in the filtering DB at step S27. If the combination is not yet registered, the port where the pertinent message has been received and the MAC addresses (MR1a, MR2a) respectively of the GWR1 and GWR2 are registered in the filtering DB at step S29 together with an initial value "10" of the aging time. If the combination of the MAC addresses and the receiving port is already registered, the aging time is updated to the initial value "10" at step S28.

Figure 6:
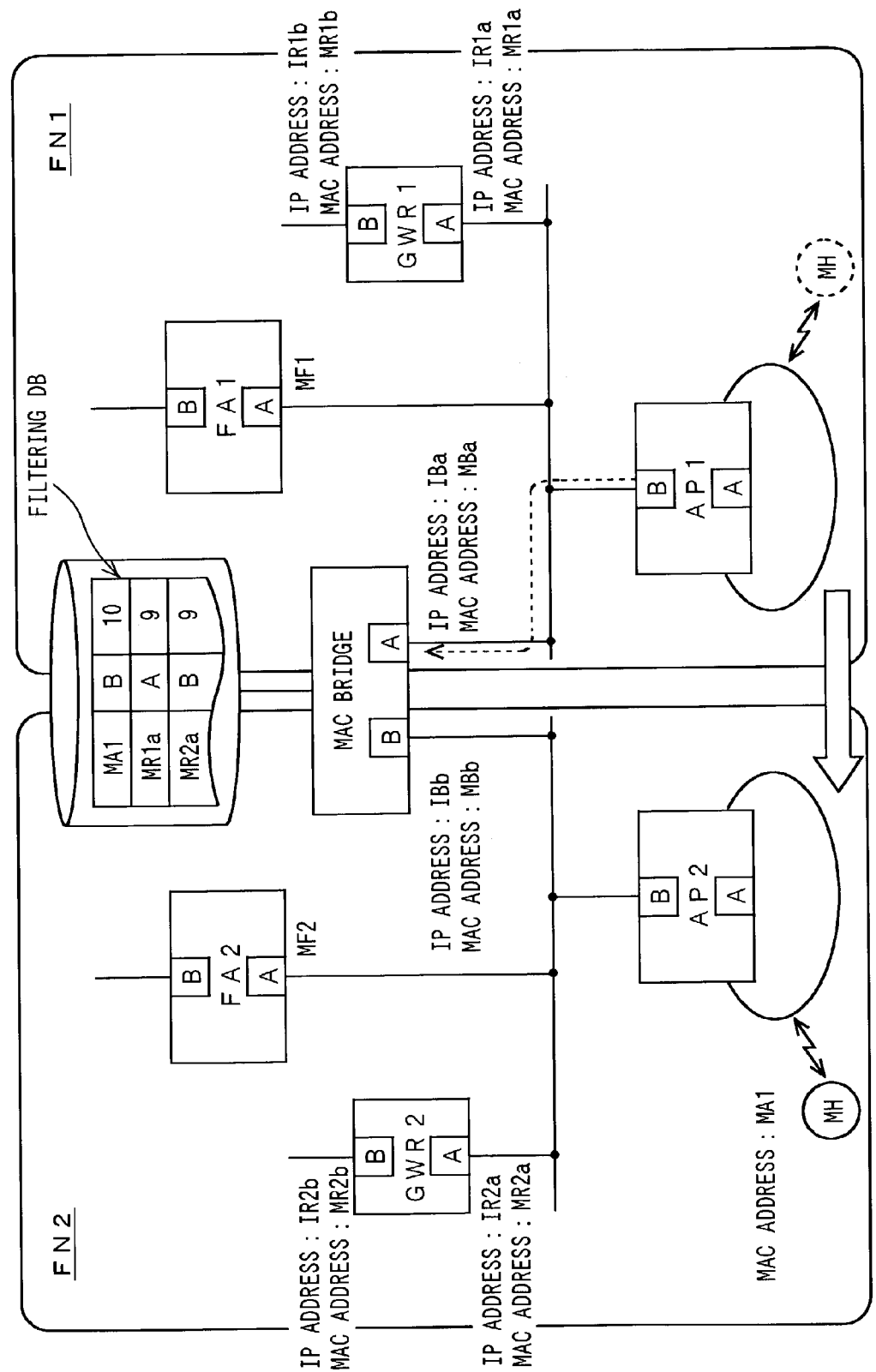

Thereafter, if the MH moves from the FN1 to the FN2 as shown in FIG. 6, then processing of the steps S11 to S14 is repeated. At this time, at the step S12, a combination [MA1, B] of the MAC address [MA1] of the MH and the receiving port "B" is judged to be not yet registered (see FIG. 5). However, an entry including the MAC address "MA1" already exists. In such a case, therefore, the already existing combination [MA1, A] including the MAC address [MA1] is updated to become a new combination [MA1, B] and the initial value "10" is registered in the aging time as shown in FIG. 6.

Figure 7:
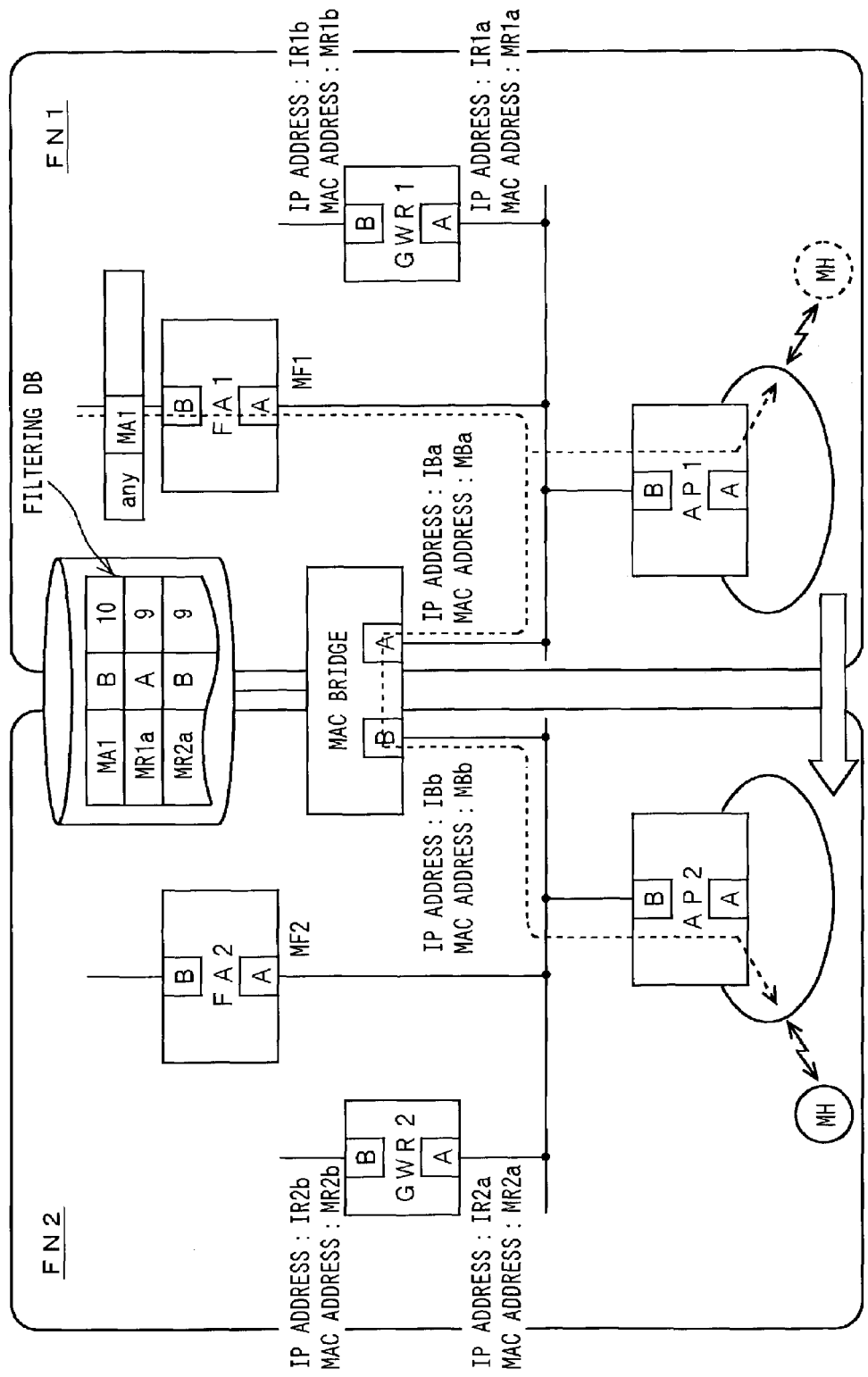
FIGS. 7 and 8 are block diagrams showing a frame transfer method conducted by the MAC bridge.

Furthermore, as shown in FIG. 7, when a frame directed to the MH is input to the FN1 where the MH is located before movement and it is sensed by the MAC bridge at step S31, the filtering DB is referred to on the basis of the destination address (MA1) of the pertinent frame at step S32. It is determined at step S33 whether the destination address is already registered in the filtering DB. Since the destination address is now judged to be already registered, the pertinent frame is transferred to a port (the port B in the case of FIG. 7) associated with the destination address (MA1) at step S34.

If the destination address "MA1" is judged at the step S33 to be not yet registered in the filtering DB, then the pertinent frame is discarded at step S35.

Figure 8:
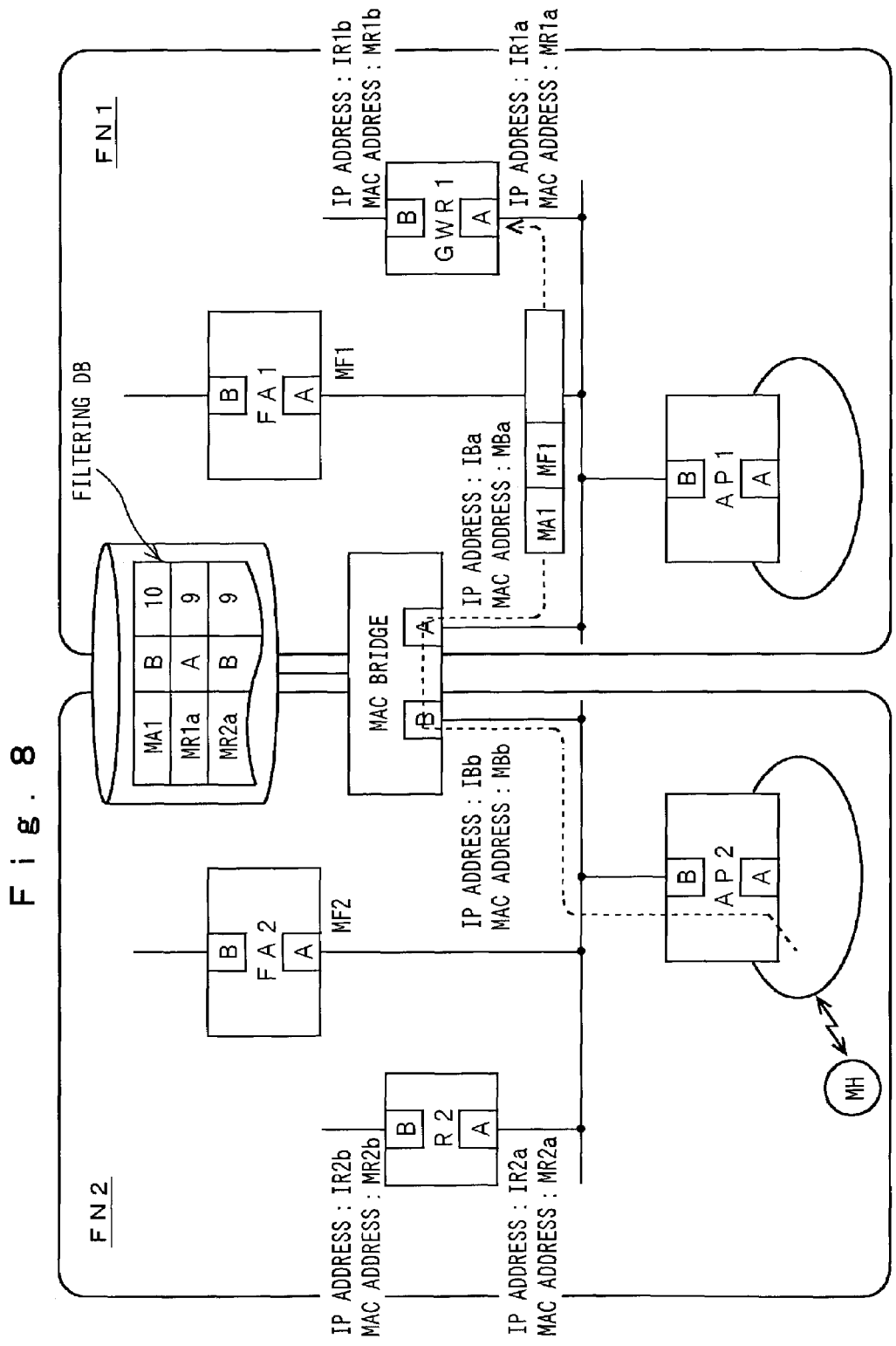
Figure 9:
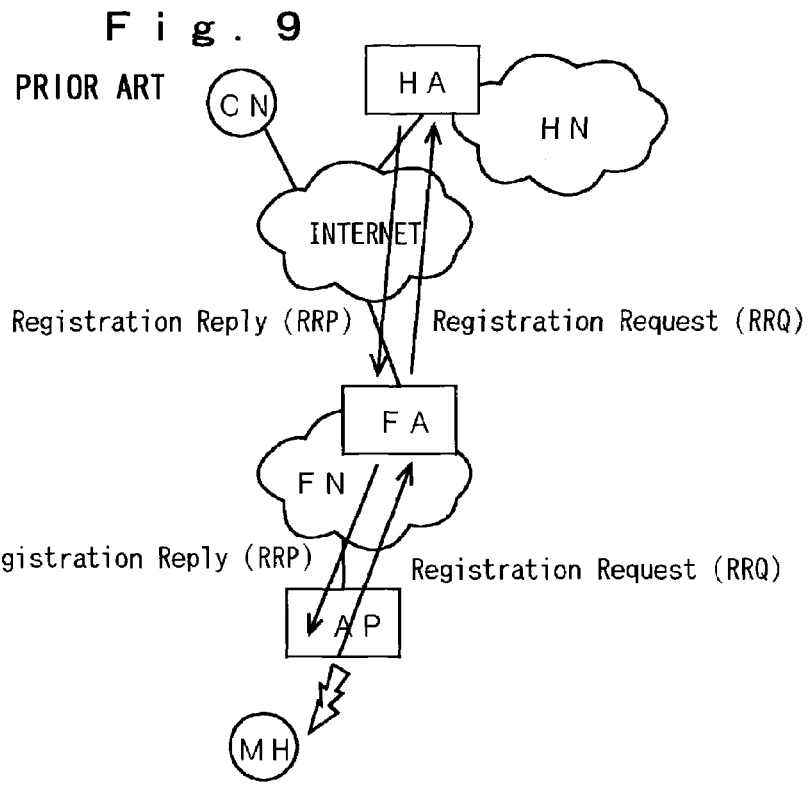
FIGS. 9 to 12 are block diagrams showing a location registration procedure in a conventional mobile IP.
Figure 10:
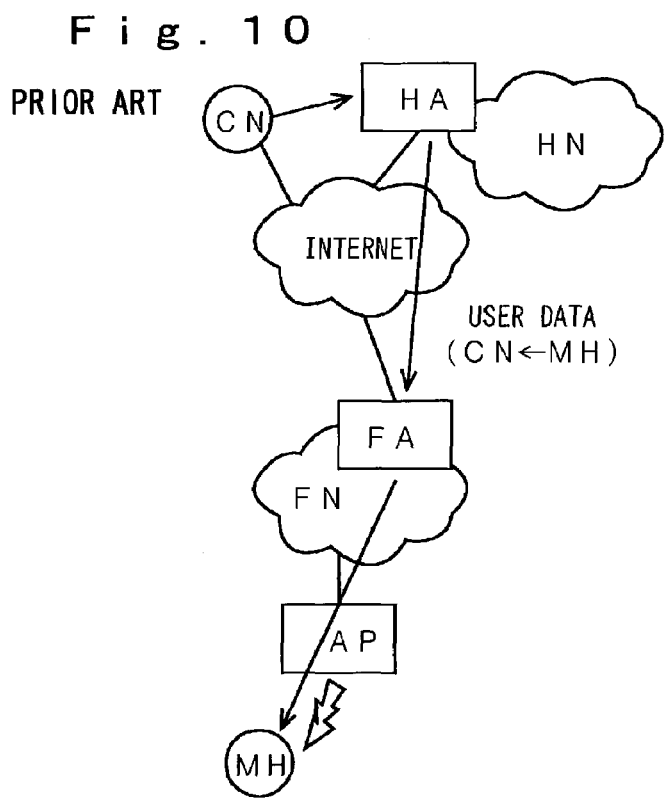
Figure 11:
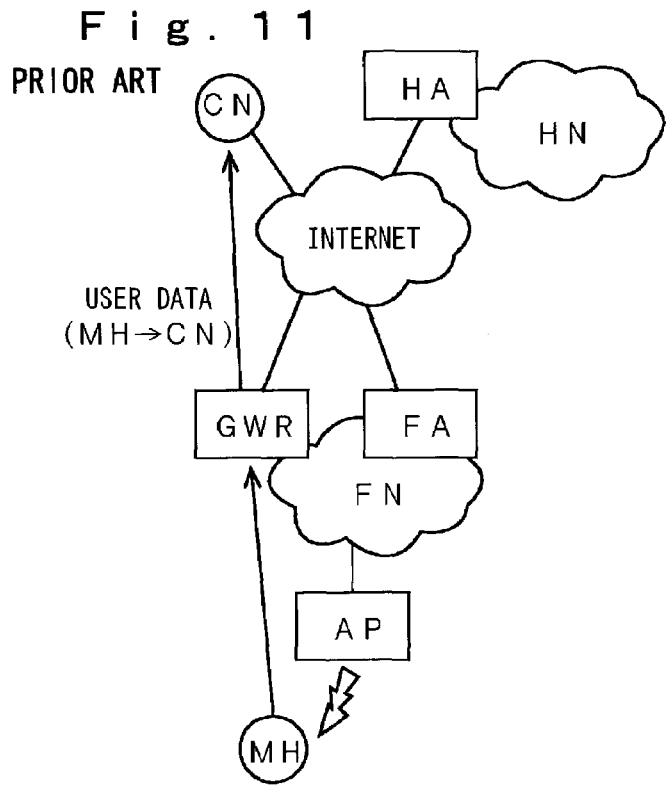
Figure 12:
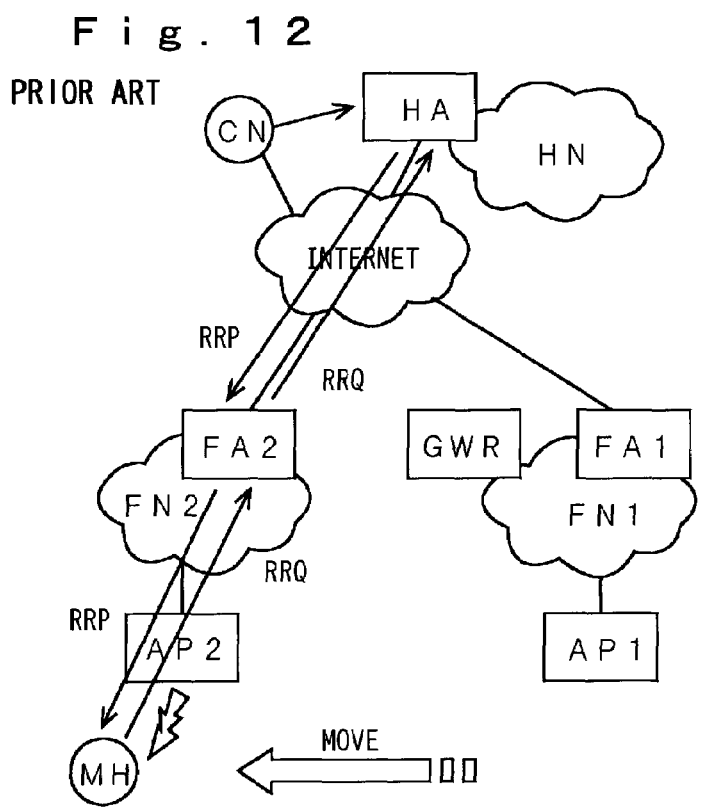

Furthermore, as shown in FIG. 8, when the MH transmits a frame to the CN, the frame is transmitted to an address (MR1a) of the GWR1 previously acquired by the AA message from the FA1, which serves as the gateway to the destination. If it is sensed by the MAC bridge at the step S31, then the filtering DB is referred to on the basis of the destination address (MR1a) of the pertinent frame at step S32. It is determined at step S33 whether the destination address is already registered in the filtering DB. Since the destination address is now judged to be already registered, the pertinent frame is transferred to a port (the port A in the case of FIG. 8) associated with the destination address (MR1a).

According to the present invention, when the MH has moved from the FN1 to the FN2, the MH can receive a frame directed to the MH but transferred to the FN1 where the MH was located before the movement, in the FN2 whereto the MH has moved, via the MAC bridge, even before location registration is completed, that is, reception of the AA message, transmission of the RRQ (registration request) message, and reception of the RRP (registration reply), if only a registration request of the MAC address of the MH is transmitted to the MAC bridge irrespective of the reception of the AA (agent advertisement) message and the MAC bridge registers the relation of association of its own address with the FN2 accommodating its own address in the filtering DB. Therefore, it becomes possible for the MH to quickly receive a frame directed to itself in the FN2 whereto the MH has moved.

What is claimed is:

1. A data transfer system using mobile IP, comprising:
   a MAC bridge having a plurality of ports to which different foreign networks (FN) are respectively connected;
   and a filtering data bas (DB) for the MAC bridge,
   wherein the MAC bridge comprises:
   means for storing a MAC address of a mobile host (MH) and an identifier of a port to which a foreign network (FN) is connected, in the filtering data base (DB), responsive to a MAC address registration request issued by an access point (AP) in a foreign network (FN);
   means for registering a relation of association of a MAC address of a terminal accommodated in a foreign network with an identifier of a port to which the foreign network (FN) is connected, in the filtering data base (DB), in the basis of an agent (FA) accommodated in each foreign network (FN); and
   means for referring to the filtering data base (DB) on the basis of the destination MAC address of a frame input to each port, and transferring the frame to a port on the basis of the already registered relation of association of the address with a port identifier.

2. The data transfer system mobile IP according to claim 1, wherein the relation of association of the MAC address of a terminal with a port identifier, registered in the filtering DB is erased when a time period during which the relation is not referred to has exceeded a predetermined time.

3. The data transfer system using mobile IP according to claim 1, wherein if an address received by means of an agent advertisement message is an IP address of a gateway, the MAC bridge executes an ARP (address resolution protocol), acquires a MAC address corresponding to the IP address, and registers a relation of association of the MAC address with a port identifier.

4. The data transfer system using mobile IP according to claim 2, wherein if an address received by means of an agent advertisement message is an IP address of a gateway, the MAC bridge executes an ARP (address resolution protocol), acquires a MAC address corresponding to the IP address, and registers a relation of association of the MAC address with a port identifier.

* * * * *